A. E. YOUNG.

Improvement in Glass Door-Knobs.

No. 126,004.  Patented April 23, 1872.

126,004

UNITED STATES PATENT OFFICE.

ALONZO E. YOUNG, OF BOSTON, MASSACHUSETTS.

IMPROVEMENT IN GLASS DOOR-KNOBS.

Specification forming part of Letters Patent No. 126,004, dated April 23, 1872.

I, ALONZO E. YOUNG, of the city of Boston, county of Suffolk, and State of Massachusetts, have invented certain Improvements in Transparent Solid Glass Door-Knobs, of which the following is a specification:

The object of my invention is to apply to and combine with a transparent solid glass door-knob, an adjustable spindle, which can, with ease and facility, be adjusted to doors of different thicknesses without penetrating the knob.

I am aware that adjustable spindles are in common use, in combination with what is known to the trade as "mineral knobs," and have also been used with opaque glass knobs, as in either case the spindle can penetrate the knob without injuring the looks and general appearance of the knob. But if the knob is penetrated it is weakened, and if it is transparent it shows both the place left for the spindle and the spindle also when adjusted to the door; therefore, so far as my knowledge extends, the adjustable spindle has never been used previous to my invention in combination with a transparent solid glass door-knob.

By the words "adjustable spindle," herein used, I mean what is known to the trade as the "extension spindle" or "adjustable spindle"—a spindle so made as to be adjustable to doors of different thicknesses—and do not mean that class of spindles which are cut the appropriate length for the thickness of the door for which it is designed.

Figure 1:
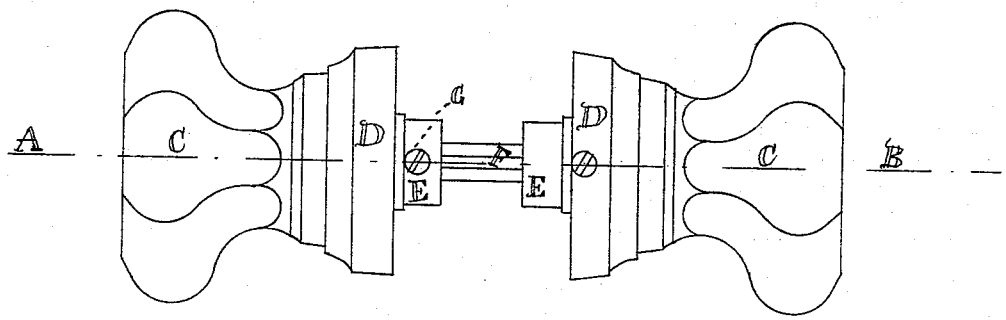
Figure 2:
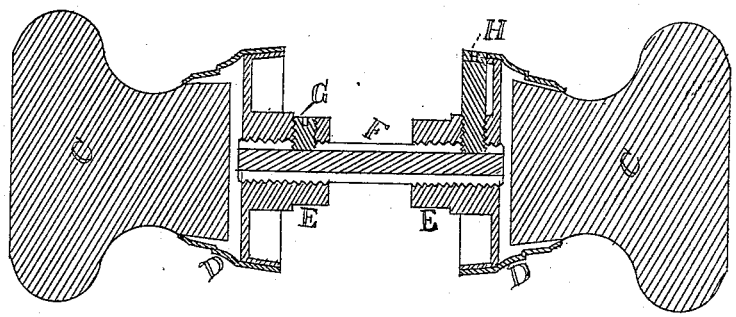

In the accompanying drawing, Figure 1 is a view of my improved transparent solid glass door-knob complete, and adjusted to its spindle. Fig. 2 is a longitudinal section of the same taken on the line A B B in Fig. 1.

Description.

In Fig. 1, C C are solid transparent glass knobs, which may be made in any desirable form, and are adjusted and attached to the sockets in the ordinary manner. The shanks E E, best shown in Fig. 2, are securely soldered to the shells, and both together form the knob-socket. It is evident that the socket may be made of one solid piece as well as in two parts, as shown. The spindle F is made of a square iron rod, cut an appropriate length, and slotted on one or more sides. It is made adjustable at both ends by having a screw-thread cut thereon. The shanks E E of the knob sockets are drilled, and a thread is cut therein corresponding to the thread at each end of the spindle F.

When fitting or adjusting to the door, the spindle F is turned into the knob-socket having the short set-screw G, which passes through the shank E only, and enters the slot in the spindle F, and thus prevents it from turning. The spindle is then passed through the door, and the other knob turned on and adjusted to the thickness of the door. The long set-screw H passing through the shell and the shank of the knob socket, is turned into the slot in the spindle F, and the two are thus tightly secured together.

By cutting a screw at both ends of the spindle a comparatively short spindle is made adjustable to doors of different thicknesses without penetrating either knob.

Having thus described the object of my invention, its construction, and operation, what I claim as new, and desire to secure by Letters Patent, is—

The combination of the extension or adjustable spindle F with the solid transparent glass door-knob C and socket D E, all constructed and arranged substantially as specified.

ALONZO E. YOUNG.

Witnesses:
F. L. KING,
J. B. WARREN.